United States Patent
Nguyen et al.

(10) Patent No.: US 10,697,422 B2
(45) Date of Patent: Jun. 30, 2020

(54) METHOD FOR PREDICTING A CHARACTERISTIC RESULTING FROM THE SWELL ON A FLOATING SYSTEM FOR AT LEAST TWO FUTURE TIME STEPS

(71) Applicant: IFP Energies nouvelles, Rueil-Malmaison (FR)

(72) Inventors: Hoai-Nam Nguyen, Lyons (FR); Paolino Tona, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 134 days.

(21) Appl. No.: 15/965,068

(22) Filed: May 17, 2018

(65) Prior Publication Data

US 2018/0313321 A1    Nov. 1, 2018

Related U.S. Application Data

(63) Continuation-in-part of application No. PCT/EP2016/074354, filed on Oct. 11, 2016.

(51) Int. Cl.
| | | |
|---|---|---|
| *F03B 13/14* | (2006.01) | |
| *F03B 13/16* | (2006.01) | |
| *F03B 13/08* | (2006.01) | |
| *F03B 15/04* | (2006.01) | |

(Continued)

(52) U.S. Cl.
CPC .............. *F03B 13/14* (2013.01); *F03B 13/08* (2013.01); *F03B 13/16* (2013.01); *F03B 15/04* (2013.01); *G01C 13/004* (2013.01); *G06F 17/18* (2013.01); *F05B 2240/95* (2013.01); *F05B 2260/821* (2013.01); *F05B 2260/8211* (2013.01); *Y02B 10/30* (2013.01); *Y02E 10/38* (2013.01)

(58) Field of Classification Search
USPC ........... 290/42, 53; 342/123, 192; 73/170.31
See application file for complete search history.

(56) References Cited

U.S. PATENT DOCUMENTS

| | | | | |
|---|---|---|---|---|
| 3,110,178 A | * | 11/1963 | Marks ................. | G01C 13/002 73/170.05 |
| 3,225,593 A | * | 12/1965 | Richard .............. | G01C 13/004 73/170.31 |

(Continued)

FOREIGN PATENT DOCUMENTS

| | | |
|---|---|---|
| FR | 2876751 A1 | 4/2006 |
| FR | 2973448 A1 | 10/2012 |
| WO | 2009/081042 A1 | 7/2009 |

OTHER PUBLICATIONS

International Search Report for PCT/EP2016/074354, dated Oct. 27, 2017 and English translation submitted herewith (7 Pages).

(Continued)

*Primary Examiner* — Pedro J Cuevas
(74) *Attorney, Agent, or Firm* — Fitch, Even, Tabin & Flannery LLP (57) ABSTRACT

The present invention relates to a method allowing short-term prediction of the wave motion (force, elevation, . . . ), from a time series of past wave measurements. The prediction method according to the invention is based on the estimation of the variable coefficients of an autoregressive model while allowing multi-step minimization, that is over a horizon of several time steps in the future, of the prediction error.

20 Claims, 3 Drawing Sheets

(51) Int. Cl.
*G01C 13/00* (2006.01)
*G06F 17/18* (2006.01)

(56) References Cited

U.S. PATENT DOCUMENTS

| | | | | | |
|---|---|---|---|---|---|
| 3,449,950 | A * | 6/1969 | McCandless | | G01C 13/002 73/170.31 |
| 3,610,038 | A * | 10/1971 | Joy et al. | | G01C 13/004 73/170.31 |
| 3,769,838 | A * | 11/1973 | Buckler | | G01C 13/004 73/170.31 |
| 3,899,668 | A * | 8/1975 | Tucker, Jr. | | G01C 13/004 702/55 |
| 3,953,905 | A * | 5/1976 | Paitson | | B63B 22/18 441/17 |
| 4,053,886 | A * | 10/1977 | Wright | | G01S 7/415 342/192 |
| 4,054,879 | A * | 10/1977 | Wright | | G01S 7/415 342/192 |
| 4,101,891 | A * | 7/1978 | Fletcher | | G01S 7/412 324/76.33 |
| 4,104,608 | A * | 8/1978 | Melling | | G01S 15/101 367/115 |
| 4,135,394 | A * | 1/1979 | Middleton | | G01C 13/002 73/170.31 |
| 4,138,752 | A * | 2/1979 | Dickson | | B63B 22/18 114/140 |
| 4,148,027 | A * | 4/1979 | Nowogrodzki | | G01S 13/50 342/104 |
| 4,172,255 | A * | 10/1979 | Barrick | | G01S 13/0218 342/26 D |
| 4,220,044 | A * | 9/1980 | LeBlanc | | G01C 13/002 73/170.01 |
| 4,466,281 | A * | 8/1984 | Rademakers | | B63B 22/04 441/1 |
| 4,499,762 | A * | 2/1985 | Bodge | | G01L 19/0046 73/170.01 |
| 4,515,013 | A * | 5/1985 | Hue | | G01P 15/00 73/170.01 |
| 4,595,925 | A * | 6/1986 | Hansen | | G01S 13/46 342/120 |
| 4,633,255 | A * | 12/1986 | Trizna | | G01S 13/951 342/192 |
| 4,986,121 | A * | 1/1991 | Luscombe | | G01C 21/16 73/170.29 |
| 4,988,885 | A * | 1/1991 | Lindstrom | | G01C 13/004 250/239 |
| 5,381,222 | A * | 1/1995 | Palmer | | G01S 15/885 356/4.01 |
| 5,642,330 | A * | 6/1997 | Santopietro | | B63G 8/38 114/244 |
| 5,703,594 | A * | 12/1997 | Anderson | | G01C 13/004 342/123 |
| 6,382,022 | B1 * | 5/2002 | Martinez | | G01C 13/002 73/178 R |
| 6,812,588 | B1 * | 11/2004 | Zadig | | F03B 13/187 290/53 |
| 6,847,326 | B2 * | 1/2005 | Harigae | | G01C 13/002 342/357.57 |
| 7,305,823 | B2 * | 12/2007 | Stewart | | F03B 13/1845 60/495 |
| 7,538,445 | B2 * | 5/2009 | Kornbluh | | F03B 13/1845 290/42 |
| 7,649,276 | B2 * | 1/2010 | Kornbluh | | F03B 13/1845 290/42 |
| 7,755,224 | B2 * | 7/2010 | Beane | | F03B 13/20 290/42 |
| 7,808,426 | B1 * | 10/2010 | Smith, Jr. | | G01C 13/004 342/123 |
| 7,830,302 | B1 * | 11/2010 | Smith, Jr. | | G01S 13/003 342/123 |
| 8,035,243 | B1 * | 10/2011 | Mesa | | F03B 13/1815 290/42 |
| 8,049,356 | B2 * | 11/2011 | Chervin | | F03B 13/20 290/53 |
| 8,143,736 | B2 * | 3/2012 | Farb | | F03B 13/1815 290/42 |
| 8,195,395 | B2 * | 6/2012 | Teng | | B63B 22/00 702/141 |
| 8,305,257 | B2 * | 11/2012 | Trizna | | G01S 7/18 342/123 |
| 8,423,487 | B1 * | 4/2013 | Rubin | | G01W 1/00 706/12 |
| 8,494,697 | B2 * | 7/2013 | Ballou | | G08G 3/02 701/21 |
| 8,519,557 | B2 * | 8/2013 | Beane | | F03B 13/20 290/53 |
| 8,701,403 | B2 * | 4/2014 | Beane | | F03B 13/20 60/496 |
| 8,766,470 | B2 * | 7/2014 | Beane | | F03B 13/20 290/53 |
| 8,841,788 | B2 * | 9/2014 | Sampaio | | F03B 13/16 290/42 |
| 8,915,078 | B2 * | 12/2014 | Beane | | F03B 13/182 290/42 |
| 8,971,150 | B2 * | 3/2015 | Kato | | G01C 13/004 367/118 |
| 9,046,608 | B2 * | 6/2015 | Hong | | G01S 13/955 |
| 9,140,231 | B1 * | 9/2015 | Wilson | | F03B 15/00 |
| 9,168,987 | B1 * | 10/2015 | Sharapov | | B63B 35/44 |
| 2004/0056779 | A1 * | 3/2004 | Rast | | B63B 22/16 340/985 |
| 2008/0224472 | A1 * | 9/2008 | Bean | | F03B 13/20 290/42 |
| 2009/0008942 | A1 | 1/2009 | Clement et al. | | |
| 2009/0160191 | A1 * | 6/2009 | Beane | | F03B 13/20 290/53 |
| 2009/0243293 | A1 * | 10/2009 | Farb | | F03B 13/1815 290/42 |
| 2009/0279383 | A1 * | 11/2009 | Napolitano | | B63B 22/20 367/4 |
| 2011/0060525 | A1 * | 3/2011 | Teng | | B63B 22/00 702/2 |
| 2011/0187101 | A1 * | 8/2011 | Beane | | F03B 13/20 290/42 |
| 2012/0319406 | A1 * | 12/2012 | Hoffmann | | F03B 15/12 290/53 |
| 2013/0341921 | A1 * | 12/2013 | Beane | | F03B 13/20 290/42 |
| 2014/0084586 | A1 | 3/2014 | Henwood et al. | | |
| 2019/0093623 | A1 * | 3/2019 | Nguyen | | F03B 13/16 |

OTHER PUBLICATIONS

Francesco Fusco et al: "Short-term wave forecasting with AR models in real-time optimal control of wave energy converters", Industrial Electronics (ISIE). 2010 IEEE International Symposium on, IEEE, Piscataway, NJ, USA, Jul. 4, 2010.

M. Arnold et al: "Adaptive AR modeling of nonstationary time series by means of Kalman filtering", IEEE Transactions on Biomedical Engineering., vol. 45, No. 5, May 1998.

Francesco Fusco et al: "Short-Term Wave Forecasting for Real-Time Control of Wave Energy Converters", IEEE Transactions on Sustainable Energy, IEEE, USA, vol. 1, No. 2, Jul. 2010.

Ringwood John Vet al: "Energy-Maximizing Control of Wave-Energy Converters: The Development of Control System Technology to Optimize Their Operation", IEEE Control Systems, IEEE, USA, vol. 34, No. 5, Oct. 2014.

F. Saupe et al: "Latching Control Strategies for a Heaving Buoy Wave Energy Generator in a Random Sea", Proceedings of the 17th World Congress the International Federation of Automatic Control; Seoul, Korea; Jul. 6-11, 2008., vol. 47, No. 3, Dec. 31, 2014.

D.S. Shook et al: "Identification for long-range predictive control", IEE Proceedings D. Control Theory & Applications.,vol. 138, No. 1, 1991, p. 75, XP055289611.

* cited by examiner

METHOD FOR PREDICTING A CHARACTERISTIC RESULTING FROM THE SWELL ON A FLOATING SYSTEM FOR AT LEAST TWO FUTURE TIME STEPS

CROSS REFERENCE TO RELATED APPLICATION

This application is a continuation in part of PCT/EP2016/074354 filed Oct. 11, 2016, which application is incorporated herein by reference in its entirety.

BACKGROUND OF THE INVENTION

Field of the Invention

The present invention relates to the field of wave prediction and in particular for controlling a wave energy conversion system.

Description of the Prior Art

Renewable energy resources have generated strong interest for some years. These are clean, free and inexhaustible resources, which are major assets in a world facing the inexorable depletion of the available fossil resources and recognizing the need to preserve the planet. Among these resources, the wave energy, a source relatively unknown amidst those widely publicized, such as wind or solar energy, contributes to the vital diversification of the exploitation of renewable energy sources. The devices, commonly referred to as "wave energy conversion devices", are particularly interesting because they allow electricity to be produced from this renewable energy source (the potential and kinetic wave energy) without greenhouse gas emissions. They are particularly well suited for providing electricity to isolated island sites.

For example, patent applications FR-2,876,751, FR-2,973,448 and WO-2009/081,042 describe devices for capturing the energy produced by the sea water forces. These devices are made up of a floating support structure on which a pendulum that is movably mounted with respect to the floating support is arranged. The relative motion of the pendulum in relation to the floating support is used to produce electrical energy by means of an energy conversion machine (an electrical machine for example). The conversion machine operates as a generator and as a motor. Indeed, in order to provide a torque or a force driving the mobile floating support, power is supplied to the conversion machine so as to create resonance with the waves (motor mode). On the other hand, to produce a torque or a force that withstands the motion of the mobile floating supports, power is recovered via the converter machine (generator mode).

In order to improve the efficiency and therefore the profitability of devices converting wave energy to electrical energy (wave energy converters), it is interesting to predict the behavior of waves, notably the force exerted on the wave energy converter or the elevation thereof in relation to the converter.

In other fields relative to floating systems (floating platform, floating wind turbine, . . . ), it is also interesting to predict the behavior of the waves for control and stability of these floating systems.

A certain number of algorithms allowing short-term prediction of the force or the elevation of the waves from time series of past measurements have been proposed in the literature. Examples thereof are the harmonic decomposition approach (implemented by Kalman filter or recursive least squares), the sinusoidal extrapolation approach (implemented by extended Kalman filter) and the autoregressive (AR) model approach with minimization, over a single time step, of the prediction error (with analytically obtained solution) or over several time steps (referred to as long-range predictive identification, or LRPI, in this case). Such approaches are described in the following documents:

Francesco Fusco and John V Ringwood. "Short-Term Wave Forecasting for Real-Time Control of Wave Energy Converters". In: Sustainable Energy, IEEE Transactions on 1.2 (2010), pp. 99-106

D S Shook, C Mohtadi, and S L Shah, "Identification for Long-Range Predictive Control". In: IEE Proceedings D (Control Theory and Applications). Vol. 138. 1. IET. 1991, pp. 75-84.

Furthermore, the following document:

B Fischer, P Kracht, and S Perez-Becker. "Online-Algorithm Using Adaptive Filters for Short-Term Wave Prediction and Its Implementation". In: Proceedings of the 4th International Conference on Ocean Energy (ICOE), Dublin, Ireland. 2012, pp. 17-19 discloses several predictor variants based on autoregressive (AR) models, and more particularly a filter bank made up of several predictors, based on AR models, whose coefficients are adapted by a recursive least squares algorithm.

None of the methods proposed so far allows generating a correct prediction by adapting automatically and continuously to the (relatively slow) sea state changes. Besides, the LRPI method is complex to implement because it is based on a very heavy calculation of the autoregressive model coefficients, which makes real-time implementation difficult.

Furthermore, some multimodel LRPI (MM-LRPI) approaches aim to take into account the sea state variability. The MM-LRPI approach is notably proposed in the B. Fischer et al. document, both in a "continuous estimation" variant where the coefficients are estimated via a recursive least squares algorithm and in an "interval estimation" variant where the coefficients are estimated by applying a least squares algorithm to data batches. It is important to note that, in both cases, application of a simple least squares algorithm allows a prediction to be made only if it is implicitly assumed that the sea state does not vary. Therefore, even though the methods described in the B. Fischer et al. document are presented as "adaptive", in reality they do not allow to adapt to the evolution of the sea state, as shown by the poor experimental results obtained, with an increasingly deteriorating prediction precision as the prediction horizon increases.

By contrast, the LRPI method described in F. Fusco et al. and in DS Shook et al. is based on an indirect prediction chain using a non-linear least squares algorithm to be executed at regular intervals, and it can monitor the evolution of the sea state, though discontinuously. However, this LRPI method involves many drawbacks:

the computation complexity, time and cost (non-linear least squares problem, without analytical solution, which requires using algorithms with significant computation times, to be executed with large data batches), re-identification of the parameters at regular intervals (offline), to monitor the sea state evolution, which requires a supervisory layer, the need for low-pass filtering of the data to obtain good results (when filtering is applied online, the phase shift it involves degrades the results), and the dependence of the prediction quality on the right choice for the sampling period, which generally changes from one data batch to the next, to take account of the characteristics of the current sea state.

SUMMARY OF THE INVENTION

To overcome these drawbacks, the present invention relates to a method allowing short-term prediction of the wave motion (force, elevation, . . . ), from a time series of past wave measurements. The prediction method according to the invention is based on the estimation of the variable coefficients of an autoregressive model while allowing multi-step minimization which is over a horizon of several time steps in the future of the prediction error. Thus, the prediction method according to the invention enables more flexible and less computation time and computer memory consumption for the prediction in relation to methods of the prior art, notably the LRPI method. Furthermore, the variability of the coefficients allows the sea state changes to be taken into account.

Figure 1:
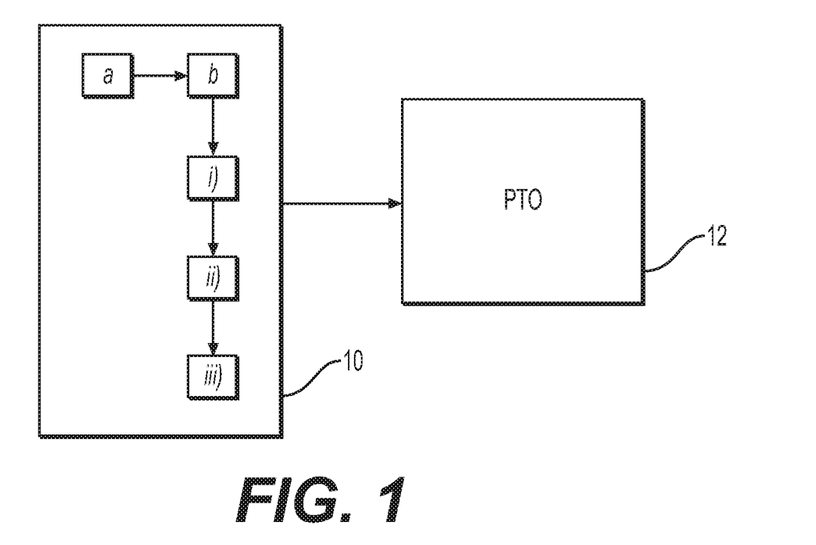
FIG. 1 is a flow chart of a method of predicting an effect of future wave motion on a floating system used to control generation of power by the floating system.

The invention relates to a method of predicting a resultant characteristic of wave motion on a floating system undergoing wave motion as shown in a flow chart in FIG. 1. For this method, the following stages are carried out:
a) measuring the characteristic for at least one time step; as shown as step "a" of FIG. 1,
b) predicting the characteristic for at least two future time steps as known as step "b" of FIG. 1 by carrying out the steps "i-iii" of FIG. 1 as follows:
  i) constructing at least one autoregressive wave model, relating a characteristic of a future time step to the measured characteristics, of step "a" by use of time-variable coefficients;
  ii) determining the time-variable coefficients by using of a random walk model; and
  iii) determining the characteristic for future time steps by using the autoregressive wave model, the determined time-variable coefficients and the measurements of the measured characteristic.

According to the invention, the characteristic is the force exerted by the waves on the floating system or the elevation of the waves on an energy generation system in relation to the floating system for generating electrical, pneumatic or hydraulic power by the floating system.

Advantageously, the time-variable coefficients are determined by use of at least one Kalman filter, notably by use of an extended Kalman filter or of a linear Kalman filter bank.

According to one aspect of the invention, the random walk model is written with a formula of the type: $a_j(k+1) = a_j(k) + \eta_j(k)$, which allows calculation of the evolution at time step k+1 of each variable coefficient $a_j$ of the autoregressive model, starting from its value $a_j(k)$ at time step k and the corresponding stochastic uncertainty $\eta_j(k)$ at time step k.

According to an embodiment of the invention, the autoregressive wave model is written with a formula of the type: $\hat{y}(k|k-1) = x_{AR}(k-1)^T a(k)$, with $\hat{y}(k|k-1)$ being the predicted characteristic at time step k, $x_{AR}(k-1)$ being the vector of the characteristics prior to time step k and $a(k)$ the vector of the time-variable coefficients of the autoregressive wave model at time step k.

Advantageously, the time-variable coefficients a(k) are determined by using an extended Kalman filter and the characteristic is determined for N future time steps later than time step k, by carrying out the following stages:
(1) considering time step p=k;
(2) constructing vector $x_{AR}(p-1)^T$ of the characteristics prior to time p;

(3) determining the characteristic $\hat{y}(p+1|k)$ for time step p+1 by use of the vector $x_{AR}(p-1)^T$ and of the vector a(k) of the time-variable coefficients; and
(4) repeating stages (2) and (3) for the N future time steps.
Alternatively, for each future time step p:
(5) constructing an autoregressive wave model;
(6) determining the time-variable coefficients of the autoregressive model of the time step p by use of an adaptive Kalman filter bank, and
(7) determining the characteristic by using the autoregressive model of the time step p and of the variable coefficients of the autoregressive model of the time step p.

Preferably, the autoregressive wave model is written with a formula of the type:

$$\hat{y}(k+h \mid k) = \sum_{j=1}^{p} a_{j,h}(k) y(k-j+1)$$

with $\hat{y}(k+h|k)$ being the characteristic predicted at time step k+h;
$y(k-j+1)$ being the characteristic measured at time step k-j+1; and
$a_{j,h}(k)$ being the time-variable coefficients of the model.

According to a feature of the invention, the characteristics of the various future time steps are determined sequentially or in parallel.

According to an embodiment of the invention, the characteristic is corrected for the future time steps to minimize the prediction error.

Advantageously, the characteristic is corrected by use of a Kalman filter.

Preferably, the floating support is a wave energy conversion system that converts the wave energy to electrical, pneumatic or hydraulic energy, on a floating platform or a floating wind turbine.

Furthermore, the invention relates to a method of controlling a wave energy conversion system wherein a resultant characteristic of wave motion on the wave energy conversion system is predicted by use of the prediction method according to one of the above features and the wave energy conversion system is controlled according to the predicted characteristic.

DETAILED DESCRIPTION OF THE INVENTION

The present invention relates to a method of predicting a resultant characteristic of wave motion on a floating system undergoing the wave motion which is used for generating power from wave motion. The predicted characteristic can notably be the force exerted by the waves on the floating system, the elevation of the waves in relation to the floating system, or any similar characteristic. The floating system can be a wave energy conversion system (in all possible forms), a floating platform (for example a platform used in the petroleum industry) or a floating (offshore) wind turbine, or any similar floating system. In the description below. The prediction method is described by way of non limitative example for a wave energy conversion system. The wave energy conversion system converts the wave energy to electrical, pneumatic or hydraulic energy. According to one design, the wave energy conversion system can comprise a mobile floating support connected to an electrical, pneumatic or hydraulic machine for energy recovery and control of the wave energy conversion system. However, all the embodiments described are suited to all the floating or oscillating systems.

Notations

The following notations are used in the description hereafter:

$t_0$ is a present time;
$T_s$ is a data acquisition period;
M is a order of the horizon over which the prediction is made;
k is a discretized time step in which the last measurement is performed (corresponds to $t_0$);
y is a wave characteristic, with:
$\hat{y}$ is the predicted wave characteristic and
$x_{AR}$ is the vector of the prior characteristics so that:
$x_{AR}(k-1)=[y(k-1)y(k-2) \ldots y(k-p)]^T$; of
a(k) is a vector of the time-variable coefficients of the autoregressive wave model with:
$a(k)=[a_1(k)a_2(k) \ldots a_p(k)]^T$; as
w(k) is wave model stochastic uncertainties
η(k) is random walk model stochastic uncertainties.

In the description hereafter, the following notation is used to represent the discrete time steps:

| Discrete times | Real times | |
|---|---|---|
| k − p − M | $t_0 − (p + M)T_s$ | Past |
| k − p | $t_0 − pT_s$ | |
| ... | ... | |
| k − 2 | $t_0 − 2T_s$ | |
| k − 1 | $t_0 − T_s$ | |
| k | $t_0$ | Present |
| k + 1 | $t_0 + T_s$ | Future |
| k + 2 | $t_0 + 2T_s$ | |
| ... | ... | |
| k + h | $t_0 + hT_s$ | |
| k + M | $t_0 + MT_s$ | | where p is the order of the autoregressive models and M the future horizon over which the wave characteristic is predicted.

In the rest of the description, the terms waves, ocean waves and wave motion are considered to be equivalent.

The prediction method according to the invention comprises the following stages which are illustrated in FIG. 1: Step d) below is not illustrated:

1. Measurement of the characteristic is made for at least one past time step
2. Prediction of the characteristic for several future time steps is made with:
   a) construction of an autoregressive model;
   b) determination of the variable coefficients;
   c) prediction of the characteristic, and possibly;
   d) correction of the predicted characteristic (optional stage).

1) Measurement of the Characteristic for at Least One Past Time Step

In this stage, a number of past values of the wave characteristic y(t), whether measured or estimated, is then stored for t=0, $T_s$, $2T_s$, $3T_s$, ..., $t_0$, where $t_0$ is the present time step and $T_s$ is the data acquisition period. The various calculations can be performed by computer or, more generically, by a calculator (therefore computer, ECU, etc.). The values can be stored in the calculator memory. The calculator can be onboard the wave energy conversion system or remote. The case of an onboard calculator allows the control method to be applied onboard. In this case, the locally measured or estimated values need to be transmitted to the remote calculator.

The purpose of this stage is to provide in the next stage p past values of y (including the current value): y(k), y(k−1), y(k−2), ..., y(k−p+1).

Measurement of the characteristic can be measuring the force of the waves exerted on the floating support, for example the force of the waves exerted on a mobile floating support of a wave energy conversion system. This measurement can be performed using a software sensor or estimator that calculates this force (referred to as excitation force) from the available measurements as for example pressures, forces exerted on the power take-off (PTO) mechanism, position, speed and acceleration of the floating support. For example, the software sensor can provide an estimation based on a pressure field measured by sensors distributed over the surface of the floating support.

According to an alternative embodiment, measurement of the characteristic can measure the wave elevation relative to the floating support, for example the wave height relative to a mobile part of a wave energy conversion system. Preferably, the wave elevation can be measured at the center of gravity of the float. This measurement can be extrapolated, for example from elevation measurements performed around the float (in particular using a software sensor). These measurements can be performed using Doppler velocimeters or accelerometers, or instrumented buoys.

2. Prediction of the Characteristic for Future Time Steps

In this stage, the characteristic is predicted for several future time steps, according to the measurements performed in the previous stage. This prediction is implemented by using of an autoregressive wave model.

a) Construction of an Autoregressive Wave Model

In this stage, at least one autoregressive wave model is constructed. An autoregressive wave model is understood to be a representative wave model connecting the characteristic, for at least one future time step, to the characteristics of the past time steps (measured characteristics), by using time-variable coefficients. The model is referred to as autoregressive because it accounts for the past values of the characteristic. The coefficients of the model are variable over time to take account for the evolution of the sea state.

The evolution of the wave characteristic can be described through an autoregressive (AR) model with time-variable coefficients by a formula:

$$y(k)=a_1(k)y(k-1)+a_2(k)y(k-2)+ \ldots +a_p(k)y(k-p)+w(k)$$

where w(k) is an unpredictable stochastic uncertainty of white noise type with a zero mean. The autoregressive wave model can thus comprise as many variable coefficients as time steps, for which the characteristic has been measured and stored. In compact form, the above equation can be written as follows:

$$y(k) = x_{AR}(k-1)^T a(k) + w(k)$$

with:

$$x_{AR}(k-1) = [y(k-1) y(k-2) \ldots y(k-p)]^T$$

$$a(k) = [a_1(k) a_2(k) \ldots a_p(k)]^T$$

According to an embodiment of the invention, a single autoregressive wave model is constructed to determine the characteristic at all the future time steps.

Alternatively, several autoregressive wave models are constructed with one being for each future time step. Each model can then be used to determine the characteristic for a single time step.

b) Determination of the Variable Coefficients

In this stage, the time-variable coefficients of the autoregressive wave model are determined. According to the invention, the coefficients are determined by using a random walk model.

According to an embodiment of the invention, the time-variable nature of the sea state is taken into account by taking the p coefficients of the autoregressive model to be variable and no longer fixed. Since the state of the sea varies, although not by much, it can be considered that each coefficient of the autoregressive model evolves as follows:

$$a_j(k+1) = a_j(k) + \eta_j(k)$$

where $\eta_j(k)$ is a stochastic uncertainty of white noise type with zero mean that is used to describe the variation of coefficient $a_j(k)$.

This corresponds to a "random walk" type model, in vector or scalar form depending on the embodiment. The random walk type model allows automatic and continuous adaptation of the autoregressive wave model.

According to an embodiment of the invention, the variable coefficients are determined by use of a Kalman filter, for example an extended Kalman filter or a linear Kalman filter bank.

This stage determines variable coefficients that minimize the error between the prediction and the real value (which is going to occur).

c) Determination of the Characteristic

For several future time steps, the characteristic is predicted by use of the autoregressive wave model, of the coefficients determined in the previous stage and of the measurements performed for the past time steps. Therefore, the autoregressive wave model (with the determined coefficients) is applied to the measured characteristics. Thus, the prediction method according to the invention is a multi-step process allowing short-term wave prediction.

According to the embodiment for which a single autoregressive wave model is constructed, the model is used to determine the wave characteristic for several time steps.

According to the alternative embodiment for which an autoregressive wave model is constructed for each time step, each model is used to determine the wave characteristic for a single time step.

d) Correction of the Predicted Characteristic

This stage is optional and it can be carried out to minimize the prediction error.

This stage applies an additional correction stage to the wave characteristic predictions generated iteratively for each future time step using a single variable-coefficient autoregressive model. The correction stage allows reduction of the error accumulation inherent in the iterative calculation of the prediction over several future time steps using a single autoregressive model and, more generally allows obtaining a prediction of higher quality by decorrelating the current prediction error from the past measurements (prediction error "whitening").

This correction stage can be directly applied to the predictions obtained from an autoregressive model whose variable coefficients are overestimated by the extended Kalman filter, by improving the quality thereof. But it can also be applied to the predictions resulting from an autoregressive model whose variable coefficients are estimated by a linear Kalman filter which, alone, does not have the ability to minimize the prediction error on several steps.

Furthermore, the invention relates to a method of controlling a wave energy conversion system that converts the wave energy to electrical, pneumatic or hydraulic energy. The control method comprises a wave prediction stage according to one of the above features, with the following stages:

1. Measurement of the characteristic for at least one past time step
2. Prediction of the characteristic for future time steps:
   a) construction of an autoregressive model
   b) determination of the variable coefficients
   c) prediction of the characteristic, and possibly
   d) correction of the predicted characteristic.

The control method according to the invention also comprises a stage of controlling the wave energy conversion system according to the wave characteristic (force, elevation, . . . ) to optimize the energy recovery. Control can control the mobile floating support of the wave energy conversion system, for example by using an electric, pneumatic or hydraulic machine, referred to as PTO (power take-off) system. This PTO system influences the movement of the mobile floating support and allows the mechanical energy to be transferred to an electrical, pneumatic or hydraulic network. Model predictive control (MPC) is an example of a method of controlling wave energy conversion systems requiring real-time short-term wave prediction. The control method according to the invention can also be applied to a wave energy conversion system belonging to the category of wave energy conversion systems with oscillating water columns (OWC).

The control method can further comprise an optional stage of correcting the predicted characteristic. This correction can be carried out using a Kalman filter.

Indeed, the control method according to the invention allows optimal control because the prediction method according to the invention provides a method for predicting the wave elevation or the force that the waves will exert on the mobile means over a short future horizon (some seconds) from a time series of measured (or estimated) values of this characteristic in the past.

Figure 2:
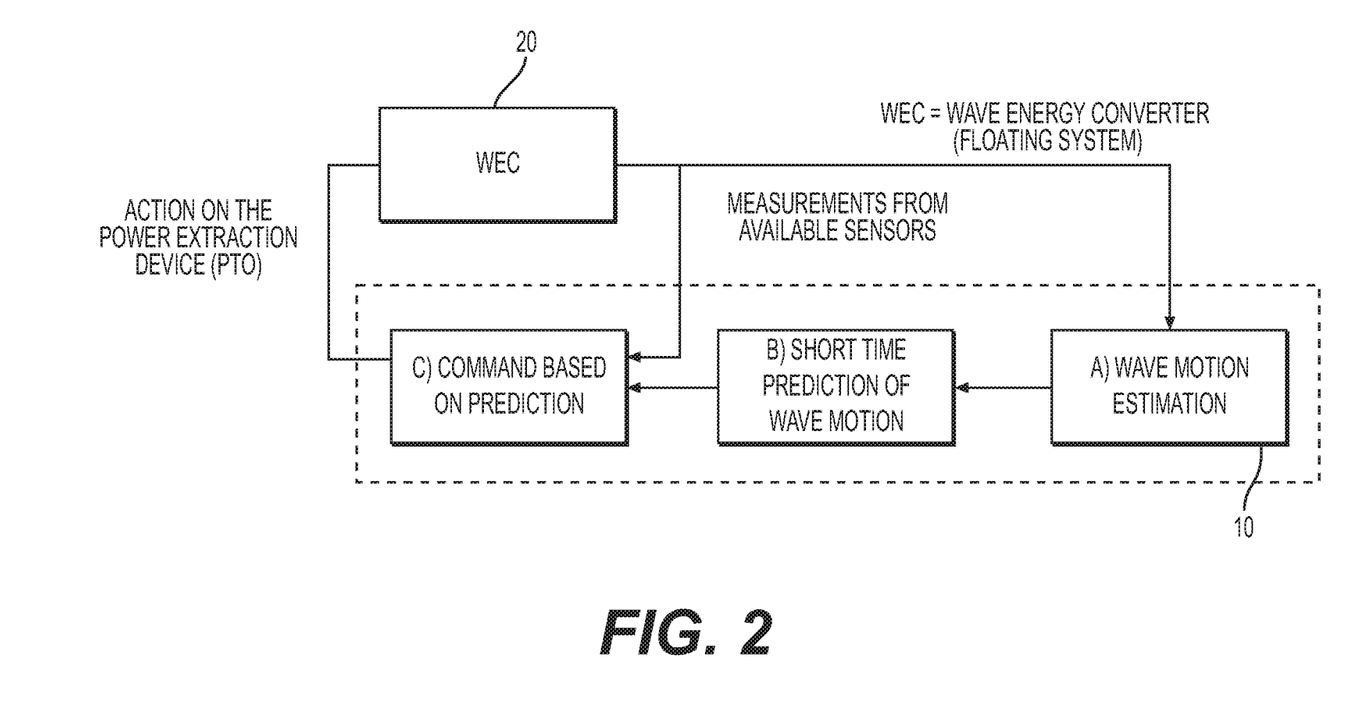
FIG. 2 is a flow chart of operation of a wave energy converter floating system in accordance with the invention.

FIG. 2 illustrates an example of the process used by the invention for powering a wave energy converter 20, which can be any floating platform which is subject to sufficient wave action, to generate substantial pneumatic, electrical or hydraulic power by driving a power takeoff (PTO) 12 which is part of wave energy converter (WEC) 20. Measurements from sensors associated with the WEC are applied to block a) which performs estimation of future waves based upon current measurements and predictions as described above. The wave motion estimation is input in to block b) which provides short time predictions of wave motion for at least two future time steps as described above. The output of block b) is applied to block c) which produces a command based on the wave short estimation of block b). The command output by block c) is used to control actuation of the PTO 12 to generate power of the types referred to above from the wave motion acting on the floating platform. The PTO produces torque or a force to generate output power.

Figure 3:
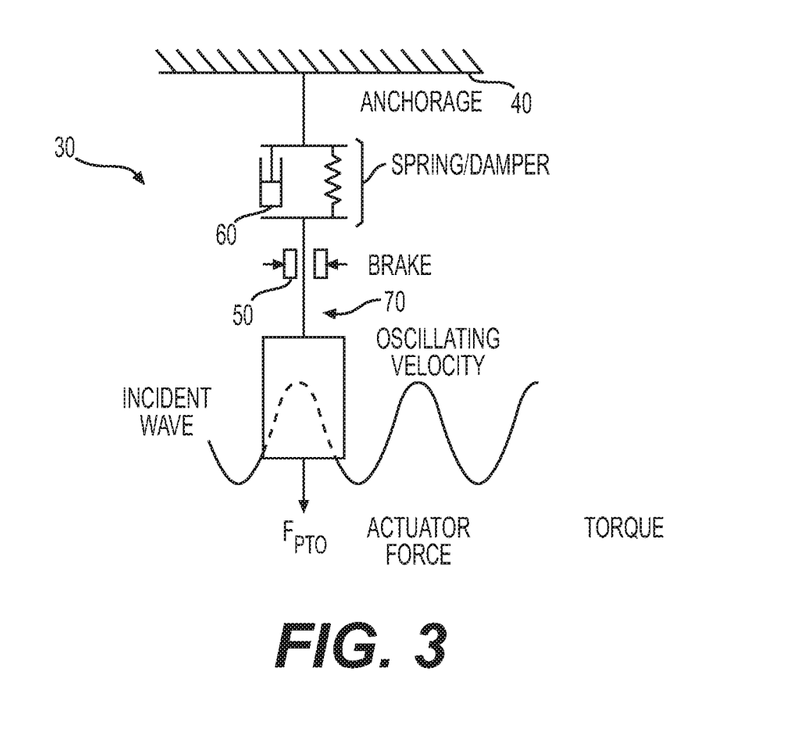
FIG. 3 is a diagram of an embodiment of a wave energy converter in accordance with the invention.

FIG. 3 illustrates an embodiment of a system 3 that produces an output actuation force $F_{pto}$ or torque (not illustrated) which drives a generator producing output power by the invention as described. The floating support may be fixed to the bottom of the sea, to a point on solid ground or to the sea coast. This embodiment functions to capture energy obtained from sea water wave forces. The floating support includes a structure on which a pendulum 70 is movably mounted reciprocate with respect to the floating support. The rocking motion of the pendulum 70 caused by forces provided from waves acting on the floating support may be used to generate the force $F_{pto}$ or torque to drive an electrical generator. The anchorage 30 and brake 50 are part of the floating support. The spring or damper 60 are disposed between the pendulum 70 and the anchorage 40 to maintain motion of the pendulum 70. The spring or damper 60 or brake 50 can be commanded to control the motion of the pendulum (for example oscillation) and then to maximize the output power generation. The "incident wave" (w) as shown is representative of wave excitation of the pendulum 70 which oscillates reciprocally at an "oscillating velocity" (v) as illustrated.

Figure 4:
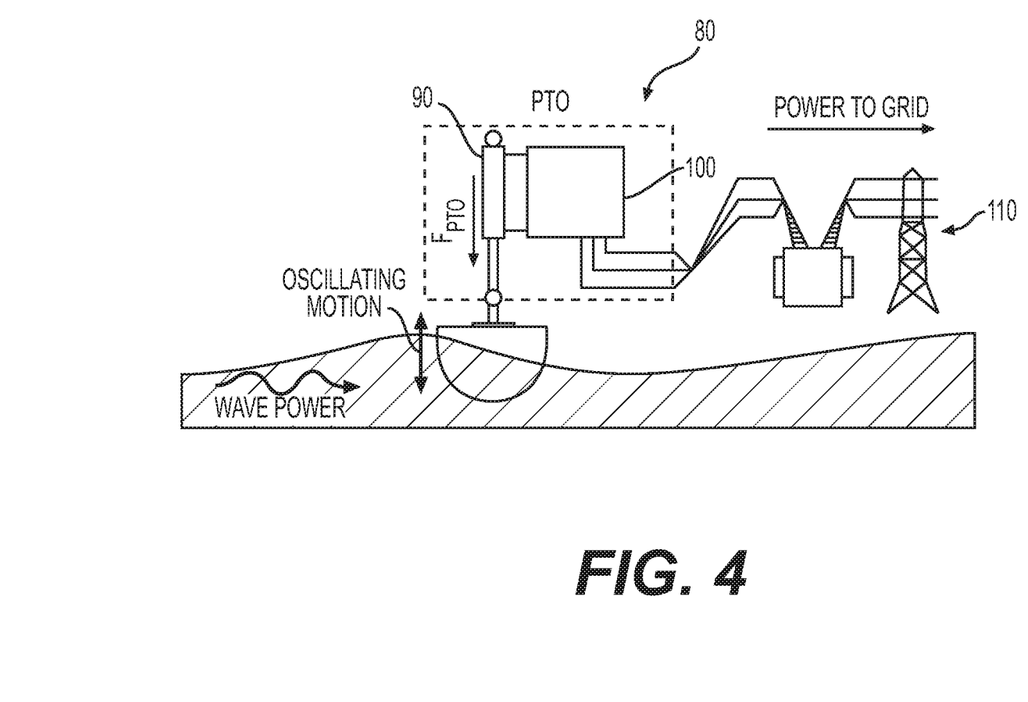
FIG. 4 is a diagram of a second embodiment of a wave energy converter in accordance with the invention for generating electrical power.

FIG. 4 illustrates a second embodiment of a system 80 for generating electrical power from sea water waves. Similar to the previous embodiments, a force $F_{pto}$ reciprocates a piston 90 which drives a 3 phase electrical generator 100 of conventional design which is transmitted to the electrical grid 110.

The main objective of the control system is to maximize the average power extracted from the wave:

$$\overline{P}_{ext} = \frac{1}{t}\int_t^t P_{ext}(t)dt$$

The electrical power is supplied to the electrical grid when the torque (force) applied by the generator opposes the movement of the float. The controlling method permits to control efficiently the torque of the PTO to maximize the average power extracted from the wave.

VARIANT EMBODIMENTS

1) First Embodiment

According to a first embodiment of the invention, a single autoregressive wave model is constructed. For this embodiment, the variable coefficients of the autoregressive model can be determined using an extended Kalman filter. Besides, the characteristic can be determined for several (N, with N≥2) future time steps by carrying out the following stages:

(1) considering time step k
(2) constructing vector $x_{AR}(k-1)^T$ of the characteristics prior to time p
(3) determining the characteristic $\hat{y}(k+1|k)$ for time step k+1 by use of the vector $x_{AR}(k-1)^T$ and the vector a(k) of the time-variable coefficients, and
(4) repeating stages (2) and (3) for the N future time steps by incrementing the time step.

Thus, the prediction method according to this first embodiment can comprise the following stages:
a) measuring the characteristic for at least one time step,
b) predicting the characteristic for at least two future time steps by carrying out the following stages:

i) constructing an autoregressive wave model, the autoregressive wave model relating the characteristic of a future time step to the measured characteristics by use of time-variable coefficients;
ii) determining the time-variable coefficients by use of a random walk model and of an extended Kalman filter; and
iii) determining the characteristic for the future time steps by use of the autoregressive wave model, the determined time-variable coefficients and the characteristic measurements, with determination being performed for N future time steps by use of the following stages:
(1) considering time step k
(2) constructing vector $x_{AR}(k-1)^T$ of the characteristics prior to time p
(3) determining the characteristic $\hat{y}(k+1|k)$ for time step k+1 by use of vector $x_{AR}(k-1)^T$ and of vector a(k) of the time-variable coefficients, and
(4) repeating stages (2) and (3) for the N future time steps by incrementing the time step.

The control method according to the first embodiment allows saving computation time in relation to the algorithms that estimate the wave force from data batches, notably in the case of large prediction horizons.

This first embodiment is detailed hereafter in a non-limitative manner. The measurement stage is not described because it does not involve any specific feature for this embodiment.

For this first embodiment, the evolution of the wave force is described through an autoregressive (AR) model with time-variable coefficients:

$$y(k)=a_1(k)y(k-1)+a_2(k)y(k-2)+ \ldots +a_p(k)y(k-p)+w(k)$$

where w(k) is an unpredictable stochastic uncertainty of white noise type with zero mean. In compact form, the above equation is written as follows:

$$y(k)=x_{AR}(k-1)^T a(k)+w(k)$$

with:

$$x_{AR}(k-1)=[y(k-1)y(k-2) \ldots y(k-p)]^T$$

$$a(k)=[a_1(k)a_2(k) \ldots a_p(k)]^T$$

The best wave force prediction at step k using the measurements up to step k−1, denoted by $\hat{y}(k|k-1)$, is obtained by eliminating what is not predictable (the uncertainty, which is zero on average):

$$\hat{y}(k|k-1)=x_{AR}(k-1)^T a(k)$$

All the parameters a of the autoregressive wave model minimizing the prediction errors made in the future are determined at every instant. The prediction error for a given step in the future can be defined as the difference between the future measurement (forward) at this time step and the prediction of the method according to the invention at this time step:

$\epsilon(k+1|k) = y(k+1) - \hat{y}(k+1|k)$  1-step forward prediction error $\epsilon(k+2|k) = y(k+2) - \hat{y}(k+2|k)$  2-step forward prediction error

... ...

$\epsilon(k+M|k) = y(k+M) - \hat{y}(k+M|k)$  M-step forward prediction error.

In relation to the methods known in the literature, the method according to the invention does not seek to minimize only the prediction error with a single future time step (forward), as follows:

$$\min_{a_1, a_2, \ldots, a_p} \sum_{l=p+1}^{k} (y(l) - \hat{y}(l|l-1))^2$$

but rather the sum of the squares of the prediction errors over several steps over a horizon M:

$$\min_{a_1, a_2, \ldots, a_p} \sum_{l=p+M+1}^{k} \sum_{j=1}^{M} (y(l) - \hat{y}(l|l-j))^2$$

Considering coefficients a of the autoregressive model constant, the solution to the first minimization problem can be obtained analytically through the least squares method. Calculation of the solution is in this case very simple, but the results are not very good for the wave prediction because the sea state evolves slowly and minimization over a single step does not allow this variation to be taken into account.

To overcome these drawbacks, the coefficients of the autoregressive wave model are determined by use of a random walk model. Indeed, the time-variable nature of the sea state is taken into account by taking the p coefficients of the autoregressive wave model variable and no longer fixed. Since the sea state varies, although not much, it may be considered that each coefficient of the autoregressive wave model evolves as follows:

$a_j(k+1) = a_j(k) + \eta_j(k)$ where $\eta_j(k)$ is a stochastic uncertainty of white noise type with zero mean that is used to describe the variation of coefficient $a_j(k)$. To describe the evolution of all the coefficients, the relationship can be written in compact vector form:

$a(k+1) = a(k) + \eta(k)$ with $$\begin{cases} a(k) = [a_1(k)\, a_2(k) \ldots a_p(k)]^T \\ \eta(k) = [\eta_1(k)\, \eta_2(k) \ldots \eta_p(k)]^T \end{cases}$$

which corresponds to a "random walk" type model.

For this first embodiment, estimation of these time-variable coefficients is done by applying a procedure known as extended Kalman filter (EKF), which is a standard approach in the non-linear state estimation theory.

This procedure addresses the non-linearity of the multi-step prediction error minimization problem. Since it is recursive, fewer computational and data storage resources are required.

At instant k, consider the 1, 2, ..., M-step forward prediction errors:

for the 1-step forward error, which we seek to reduce as much as possible, the following relations can be written:

$\epsilon_1(k) = y(k) - \hat{y}(k|k-1)$ where $\hat{y}(k|k-1) = x_{AR}(k-1)^T a(k)$ for the 2-step forward error, which we seek to reduce as much as possible, the following relations can be written:

$\epsilon_2(k) = y(k) - \hat{y}(k|k-2)$ where $\hat{y}(k|k-2)$ is the prediction at instant k using the measurements y(k-2), y(k-3), ..., which can be calculated iteratively via $\hat{y}(k-1|k-2)$ as follows:

$\hat{y}(k|5-2) = a_1(k)\hat{y}(k-1|k-2) + a_2(k)y(k-2) + \ldots + a_p(k)y(k-p)$ with $\hat{y}(k-1|k-2) = a_1(k)y(k-2) + a_2(k)y(k-3) + \ldots + a_p(k)y(k-p-1)$ which yields the (non-linear) expression as follows:

$\hat{y}(k|k-2) = (a_1(k)^2 + a_1(k))y(k-2) + (a_1(k)a_2(k) + a_2(k))y(k-3) + \ldots + a_1(k)a_p(k)y(k-p-1)$ for the M-step forward error, which should be reduced as much as possible, the following relations can be written:

$\epsilon_M(k) = y(k) - \hat{y}(k|k-M)$ where $\hat{y}(k|k-M)$ is the prediction at time M using the measurements y(k-M), y(k-M-1), ..., which can be calculated iteratively in the same way as $\hat{y}(k|k-2)$.

By combining the expressions for the prediction errors, the following system of equations is obtained:

$$\begin{cases} y(k) = \hat{y}(k|k-1) + \epsilon_1(k) \\ y(k) = \hat{y}(k|k-2) + \epsilon_2(k) \\ \vdots \\ y(k) = \hat{y}(k|k-M) + \epsilon_M(k) \end{cases}$$

that can be considered to be the output equation of a system in state form to which the EKF procedure is applied. In this context, residues $\epsilon_j(k)$ are considered to be noise, which also represents the measurement perturbation.

By combining the above equations, resulting from the multi-step prediction error calculation, with the random walk model equation describing the evolution of coefficients a(k), the following system can be obtained, which is considered to be a global state representation of the system:

$$\begin{cases} a(k+1) = a(k) + \eta(k) \\ \begin{bmatrix} y(k) \\ y(k) \\ y(k) \\ y(k) \end{bmatrix} = \begin{bmatrix} \hat{y}(k|k-1) \\ \hat{y}(k|k-2) \\ \vdots \\ \hat{y}(k|k-M) \end{bmatrix} + \epsilon(k) \end{cases}$$

where $\epsilon(k) = [\epsilon_1(k)\, \epsilon_2(k) \ldots \epsilon_M(k)]^T$.

This system has the form of a conventional state representation. The equation of state is linear in relation to the state, here coefficients $a_j$ of autoregressive wave model AR. The output equation, which is all the equations resulting from the multi-step prediction error calculation, is non-linear in relation to these coefficients $a_j$. The state of a system in this form can be estimated using an extended Kalman filter (EKF) approach.

The EKF procedure allows estimation of unknown coefficients (those of the autoregressive wave model) of a system by minimizing the residues. Modelling is performed in such a way that these residues correspond to the 1, 2, ..., M future time steps (forward) calculated at instant k. Thus, minimization of the residues carried out with the EKF procedure allows these prediction errors to be minimized.

The method according to this first embodiment models by setting up equations, which allows applying an extended Kalman filter to a noisy non-linear system whose unknown parameters are the variable coefficients of the autoregressive model representing the evolution of the wave characteristic (force, elevation, ... ).

The extended Kalman filter is a recursive algorithm that minimizes the square root of the estimation error of the parameters of a noisy non-linear system. For the system defined above, it provides the solution to the minimization problem as follows:

$$\min_{a(k)} \left\{ (a(0) - a(0|0))^T P_0^{-1}(a(0) - a(0|0)) + \sum_{l=1}^{k} \eta(l-1)^T Q^{-1} \eta(l-1) + \epsilon(l)^T R^{-1} \epsilon(l) \right\}$$

where $P_n$, Q and R are square real matrices of dimension p×p, p×p, M×M respectively and a(0|0) the mean value of the unknown initial state a(0).

At every instant k the EKF algorithm calculates the solution to this problem in two stages.

The first stage is the temporal updating of the estimations:

$$\begin{cases} a(k|k-1) = a(k-1|k-1) \\ P(k|k-1) = P(k-1|k-1) + Q \end{cases}$$

where a(k|k−1) and P(k|k−1) are respectively the estimation of parameters a(k) and their covariance matrix obtained using the measurements from time k−1, and a(k−1|k−1) and P(k−1|k−1) are respectively the estimation of parameters a(k−1) and their covariance matrix obtained using the measurements from time k−1.

The second stage is the updating of the measurements:

$$\begin{cases} K(k) = P(k|k-1)H(k)(H(k)^T P(k|k-1)H(k) + R)^{-1} \\ a(k|k) = a(k|k-1) + K(k)\left( \begin{bmatrix} y(k) \\ y(k) \\ \vdots \\ y(k) \end{bmatrix} - \begin{bmatrix} \hat{y}(k|k-1) \\ \hat{y}(k|k-2) \\ \vdots \\ \hat{y}(k|k-M) \end{bmatrix} \right) \\ P(k|k) = (I - K(k)H(k))P(k|k-1) \end{cases}$$

with $H(k) = \left. \frac{dh(k)}{da} \right|_{a = a(k-1)}$ where $h(k) = \begin{bmatrix} \hat{y}(k|k-1) \\ \hat{y}(k|k-2) \\ \vdots \\ \hat{y}(k|k-M) \end{bmatrix}$ and I is the identity matrix of appropriate dimensions.

Once the vector of the optimal parameters a(k|k) obtained, it can be used to predict the wave characteristic as follows, at every instant k using the inputs: wave measurements y(k), y(k−1), ..., estimated parameters a(k|k), prediction horizon M to calculate the outputs: future estimations of the wave characteristic $\hat{y}(k+1|k)$, $\hat{y}(k+2|k)$, ..., $\hat{y}(k+M|k)$. To that end:

i. initialize s=1 and x=[y(k) y(k−1) ... y(k−p+1)]
ii. calculate the predictions $\hat{y}(k+s|k)$ $$\begin{cases} y_f = x^T a(k|k) \\ \hat{y}(k+s|k) = y_f \\ x = [y_f \; x(1:p-1)^T]^T \\ s = s+1 \end{cases}$$

iii. if s≤M, stage ii is repeated, otherwise the procedure is stopped.

2) Second Embodiment

According to a second embodiment of the invention, several autoregressive wave models are constructed with one for each future time step. For this embodiment, the variable coefficients of the autoregressive model can be determined by use of a linear Kalman filter bank. A filter bank is understood to be a set of filters.

Thus, the prediction method according to this second embodiment can comprise the following stages:
a) measuring the characteristic for at least one time step;
b) predicting the characteristic for at least two future time steps by carrying out the following stages:
  i) constructing autoregressive wave models with one for each time step k, each autoregressive wave model relating the characteristic of a future time step to the measured characteristics by use of time-variable coefficients;
  ii) determining the time-variable coefficients of each autoregressive wave model by use of a random walk model and of an adaptive Kalman filter bank; and
  iii) determining the characteristic for the future time steps by using the autoregressive wave models, the determined time-variable coefficients and the measurements of the characteristic with determination being performed for each time step by use of the autoregressive model of the time step concerned and the variable coefficients of the time step concerned.

For this embodiment, the prediction for the various time steps can be performed sequentially or in parallel.

The control method according to the second embodiment allows prediction over several time steps without dependence between the predictions of the previous time steps.

This second embodiment is detailed hereafter in a non-limitative manner. The measurement stage is not described because it involves no specific feature for this embodiment.

For this second embodiment, assume that the wave characteristic (force, elevation, . . . ) at the future step h y(k+h) is a linear combination, with time-variable coefficients, of the present and past measurements y(k), y(k−1), . . . , y(k−p+1):

$$y(k+h) = a_{1,h}(k)y(k-1) + a_{2,h}(k)y(k-2) + \ldots + a_{p,h}(k)y(k-p+1) + w_h(k+h)$$

where $w_h(k+h)$ is an unpredictable stochastic uncertainty of white noise type with zero mean. In compact form:

$$y(k+h) = \sum_{j=1}^{p} a_{j,h}(k)y(k-j+1) + w_h(k+h)$$

It is a particular form of autoregressive model (AR) where the h−1 first coefficients are zero.

For each time step h=1, 2, . . . , M, a model is constructed allowing to predict the future wave value at time step h, At step h, the best prediction possible, resulting from the corresponding autoregressive model, in the presence of uncertainty $w_h(k+h)$, is given by:

$$\hat{y}(k+h \mid k) = \sum_{j=1}^{p} a_{j,h}(k)y(k-j+1)$$

There are h different autoregressive models AR with one for each future prediction step. Therefore it is possible to minimize each prediction error independently:

$\epsilon(k+1 \mid k) = y(k+1) - \hat{y}(k+1 \mid k)$  1-step forward prediction error $\epsilon(k \mid 2|k) = y(k \mid 2) - \hat{y}(k \mid 2|k)$  2-step forward prediction error

...  ...

$\epsilon(k+h \mid k) = y(k+h) - \hat{y}(k+h \mid k)$  h-step forward prediction error

...  ...

$\epsilon(k+M \mid k) = y(k+M) - \hat{y}(k+M \mid k)$  M-step forward prediction error by solving:

$$\min_{a_h} \sum_{i=p+h}^{k} (y(l) - \hat{y}(l \mid l-h))^2$$

for each model separately.

Thus a set (bank) of predictors and each predictor is dedicated to prediction at a different future instant, using only the measurements up to the current instant of time. These are referred to as "direct multi-step predictors" as opposed to the "plug-in" (or "indirect") multi-step predictors consisting in a sequence of predictors with a single forward step where the prediction for time step h is treated as a measurement for the prediction of step h+1. Plug-in multi-step predictors potentially suffer from prediction error accumulation problems.

If the coefficients of each model were constant, i.e. if $a_n(k+1) = a_n(k)$, the solution of this minimization problem and the calculation of the corresponding prediction $\hat{y}(k+h|k)$ would be very easy (analytical solution of a least squares problem), but the prediction is imprecise.

The second embodiment accounts for the evolution of the sea state through the variability of the autoregressive model coefficients and allows obtaining good precision with limited complexity and resources.

For the second embodiment, the time-variable nature of the sea state is taken into account by considering the p coefficients of each autoregressive model as varying with time. Since the state of the sea varies, although not much, it can be considered that each coefficient of each autoregressive wave model evolves as follows:

$$a_{j,h}(k+1) = a_{j,h}(k) + \eta_{j,h}(k)$$

where $\eta_j(k)$, $\forall j=1, 2, \ldots, p$ is a stochastic uncertainty of white noise type with zero mean that is used to describe the variation of $a_{j,h}(k)$, which corresponds to the use of a random walk type model to describe the evolution of each parameter of the bank of AR models.

With $$\eta_h(k) = [\eta_{1,h}(k) \eta_{2,h}(k) \ldots \eta_{p,h}(k)]^T$$

$$a_h(k+1) = a_h(k) + \eta_h(k)$$

It is obtained $$\begin{aligned} a_h(k) &= a_h(k-1) + \eta_h(k-1) \\ &= a_h(k-2) + \eta_h(k-2) + \eta_h(k-1) - \cdots \\ &= a_h(k-h) + \sum_{v=1}^{h} \eta_h(k-v) \end{aligned}$$

and therefore $$a_h(k-h) = a_h(k) - \sum_{v=1}^{h} \eta_h(k-v)$$

which allows relating the past values of the coefficients to their current values.

For this second embodiment, estimation of the time-variable coefficients $a_h(k)$ for each autoregressive model can be achieved by applying a procedure known as linear Kalman filter or Kalman filter (KF).

The compact form of the wave value at instant k given by each AR model is written as:

$$y(k) = \sum_{j=1}^{p} a_{j,h}(k-h)y(k-h-j+1) + w_h(k) \text{ as}$$

$$y(k) = -x_h(k)^T a_h(k) + \mu_h(k) \text{ where}$$

$$x_h(k) = [y(k-h) \ y(k-h-1) \ \ldots \ y(k-h-p+1)]^T,$$

$$\mu_h(k) = -x_h(k)^T \sum_{v=1}^{h} \eta_h(k-v) + w_h(k)$$

which allows obtaining a system of equations in form of a state representation which, for each step h over which the prediction has to be calculated, combines the evolution of the wave force through an autoregressive model and the evolution of the (unknown) coefficients of this model:

$$\begin{cases} a_h(k+1) = a_h(k) + \eta_h(k) \\ y(k) = x_h(k)^T a_h(k) + \mu_h(k) \end{cases} \text{ or }$$

$$\begin{cases} a_h(k+1) = a_h(k) + \eta_h(k) \\ y(k) = \sum_{j=1}^{p} a_{j,h}(k) y(k-h-j+1) + \mu_h(k) \end{cases}$$

$a_h(k)$ goes linearly into the above system. One way of estimating unknown state vector u $a_h(k)$ in an optimal and recursive manner applies the Kalman filter (KF) algorithm to this system.

The Kalman filter (KF) is a recursive algorithm minimizing the square root of the estimation error of parameters of a noisy linear system. For the system defined above, it provides the solution to the minimization problem as follows:

$$\min_{a_h(k)} \left\{ (a_h(0) - a_n(0|0))^T P_0^{-1} (a_n(0) - a_n(0|0)) + \sum_{l=1}^{k} \eta_h(l-1)^T Q_h^{-1} \eta_h(l-1) + \mu_h(l)^T R_h^{-1} \mu_h(l) \right\}$$

where $P_0$ and $Q_h$ are square real matrices of dimension p×p and p×p respectively, $R_h$ a real scalar and $a_h$ (0|0) the mean value of the unknown initial state $a_h$ (0|0).

At every instant k the Kalman filter algorithm calculates the solution to this problem in two stages.

The first stage is the temporal updating of the estimations:

$$\begin{cases} a_h(k|k-1) = a_h(k-1|k-1) \\ P_h(k|k-1) = P_h(k-1|k-1) + Q_h \end{cases}$$

where $a_h(k|k-1)$ and $a_h(k|k-1)$ are respectively the estimation of parameters $a_h(k)$ and their covariance matrix obtained using the measurements from instant k−1 and $a_h(k-1|k-1)$ and $P_h(k-1|k-1)$ are respectively the estimation of parameters $a_h(k-1)$ and their covariance matrix obtained using the measurements from instant k−1.

The second stage is the updating of the measurements:

$$\begin{cases} K_h(k) = P_h(k|k-1) x_h(k)(x_h(k)^T P_h(k|k-1) x_h(k) + R_h)^{-1} \\ a_h(k|k) = a_h(k|k-1) + K_h(k)(y(k) - x_h(k)^T a_h(k|k-1)) \\ P_h(k|k) = (I - K(k) x_h(k)) P_h(k|k-1) \end{cases}$$

Recursive application of this algorithm obtains an estimation of parameters $a_h(k|k)$ of the AR model predicting the wave motion at step h, from the vector of past measurements $x_h(k)=[y(k-h)\ y(k-h-1) \ldots y(k-h-p+1)]^T$.

Once the optimal estimation of parameters $a_h(k|k)$ obtained, it can be used to predict the wave excitation force at step h as follows:

$$\hat{y}(k+h|k) = x_{AR}(k)^T a_h(k|k)$$

where $x_{AR}(k)=[y(k)y(k-1) \ldots y(k-p+1)]^T$ is the vector of the past measurements over the p steps preceding the current time k.

According to the second embodiment, the method of predicting a wave characteristic over a horizon M applies the above algorithm, for each time step h=1, 2, . . . , M, sequentially or in parallel.

3) Third Embodiment

This third embodiment applies an additional correction stage (optional stage d) of the method) to the wave characteristic predictions generated iteratively for each future time step using a single variable-coefficient autoregressive model. The correction stage allows reducing the error accumulation inherent in the iterative calculation of the prediction over several future steps using a single autoregressive model and, more generally and obtains a prediction of higher quality by decorrelating the current prediction error from the past measurements (prediction error "whitening").

This correction stage can be directly applied to the predictions obtained from an autoregressive model whose variable coefficients are overestimated by the extended Kalman filter, that is predictions resulting from the first variant embodiment, by improving the quality thereof. But it can also be applied to the predictions resulting from an autoregressive model whose variable coefficients are estimated by a linear Kalman filter which, alone, does not have the ability to minimize the prediction error on several steps.

Therefore consideration is possible, as for the first variant embodiment, that the wave force evolution can be described by a model of the form:

$$y(k)=a_1(k)y(k-1)+a_2(k)y(k-2)+ \ldots +a_p(k)y(k-p)+w(k)$$

where (k) is an unpredictable stochastic uncertainty of white noise type with zero mean and p is the order of the AR model, which gives, in compact form:

$$y(k)=x_{AR}(k-1)^T a(k)+w(k)$$

with $$x_{AR}(k-1)=[y(k-1)y(k-2) \ldots y(k-p)]^T$$

$$a(k)=[a_1(k)a_2(k) \ldots a_p(k)]^T$$

By using the procedure implemented in the first embodiment, consideration occurs that the evolution of these time-variable coefficients is described by a random walk model. These coefficients can be estimated by means of an extended Kalman filter (as in the first embodiment) or a linear Kalman filter (as in the second embodiment):

$$a(k|k)=[a_1(k|k)a_2(k|k) \ldots a_p(k|k)]^T$$

The prediction at the first step can be given by $$\hat{y}_f(k+1|k)=x_{AR}(k)^T a(k|k)$$

The predictions at the next future time steps can be obtained iteratively as follows:

$$\hat{y}_f(k+h|k)=a_1(k|k)\hat{y}_f(k+h-1|k)+a_2(k|k)\hat{y}_f(k+h-2|k)+ \ldots +a_p(k|k)\hat{y}_f(k+h-p-1|k)$$

which corresponds to the following algorithm (the same applied at the end of the first variant):

using the inputs: wave measurements, estimated parameters, prediction horizon M to calculate the outputs: future estimations of the wave characteristic. To that end:

i. initialize s=1 and x=[y(k) y(k−1) . . . y(k−p+1)]$^T$
ii. calculate the predictions $\hat{y}_f(k+s|k)$ $$\begin{cases} y_l = x(k)^T a(k|k) \\ \hat{y}_l(k+s|k) = y_f \\ x - [y_l, x(1:p-1)^T]^T \\ s = s+1 \end{cases} \quad 5$$

iii. if s≤M (M prediction horizon), stage ii is repeated, otherwise the procedure is stopped.

In the third embodiment, the predictions resulting from this first stage (except for the first-step prediction, which requires no correction) are corrected in a second stage in order to improve them.

The prediction error made at step h in the future is:

$$\epsilon(k+h) = y(k+h) - \hat{y}_f(k+h|k)$$

It is desired calculate a new prediction such that the new prediction error obtained is as close as possible to a white noise. We therefore model the prediction error at step h from the first stage:

$$\epsilon(k+h) = \sum_{j=1}^{p_{\alpha,h}} \alpha_{j,h}(k) y(k-j+1) + \xi(k)$$

where $p_{\alpha,h}$ is the order of the error model, which is considered to be a linear combination of the present and past measurements of the wave characteristic through the variable parameters, $\alpha_{j,h} \forall j=1, 2, \ldots, p_{\alpha,h}$ and $\xi(k)$ is an unpredictable stochastic uncertainty of white noise type with zero mean. The order of the model $p_{\alpha,h}$ can be different for different steps h.

In compact form:

$$\epsilon(k+h) = x_{AR}(k)^T \alpha_h(k) + \xi(k) \text{ where:}$$

$$\begin{cases} x_{AR}(k) = [y(k)\ y(k-1)\ \ldots\ y(k-p_{\alpha,h}+1)]^T \\ \alpha_h(k) = [\alpha_{1,h}(k)\ \alpha_{2,h}(k-1)\ \ldots\ \alpha_{p_{\alpha,h},h}(k-p_{\alpha,h}+1)]^T \end{cases}$$

Assuming that the evolution of parameters $\alpha_h(k)$ of the prediction error model is described by a random walk type model (like the one used for the coefficients of the autoregressive model of the wave characteristic in the first stage), they can be estimated by applying a (second) Kalman filter to the following equation of state:

$$\begin{cases} \alpha_h(k+1) = \alpha_h(k) + \eta_\alpha(k) \\ \epsilon(k+h) = x_{AR}(k)^T \alpha_h(k) + \xi(k) \end{cases}$$

where $\eta_\alpha(k)$ is a stochastic uncertainty vector, of white noise type with zero mean.

Since error $\epsilon(k+h)$ is unknown at time k, because measurement $y(k+h)$ is unknown, it cannot be used directly. It is however possible to shift it in time so as to make it usable, for example as follows:

$$\epsilon(k) = x_{AR}(k-h)^T \alpha_h(k-h) + \xi(k-h)$$

Using the first equation, the following is obtained:

$$\begin{cases} \alpha_h(k) = \alpha_h(k-1) + \eta_\alpha(k-1) \\ \phantom{\alpha_h(k)} = \alpha_h(k-2) + \eta_\alpha(k-1) + \eta_\alpha(k-2) \\ \phantom{\alpha_h(k)} \vdots \\ \phantom{\alpha_h(k)} = \alpha_h(k-h) + \eta_\alpha(k-1) + \eta_\alpha(k-2) + \ldots + \eta_\alpha(k-h) \\ \phantom{\alpha_h(k)} = \alpha_h(k-h) + \sum_{j=1}^{h} \eta_\alpha(k-j) \end{cases}$$

and the first time-shifted equation can be rewritten as follows:

$$\epsilon(k) = x_{AR}(k-h)^T \alpha_h(k) - x_{AR}(k-h)^T \sum_{j=1}^{h} \eta_\alpha(k-j) + \xi(k-h)$$

or, in an equivalent manner:

$$\epsilon(k) = x_{AR}(k-h)^T \alpha_h(k) + \mu(k) \text{ where}$$

$$\mu(k) = -x_{AR}(k-h)^T \sum_{j=1}^{h} \eta_\alpha(k-j) + \xi(k-h)$$

which allows defining the new system:

$$\begin{cases} \alpha_h(k+1) = \alpha_h(k) + \eta_\alpha(k) \\ \epsilon(k) = x_{AR}(k-h)^T \alpha_h(k) + \mu(k) \end{cases}$$

to which the Kalman filter is applied, using the covariance matrices $Q_h$ and $R_h$ of $\eta_\alpha$ and $\mu$ respectively.

The predictable part of the prediction error $$\hat{\epsilon}(k) = x_{AR}(k-h)^T \alpha_h(k)$$

is the correction to be applied at each step h, h≥2, to prediction $\hat{y}_f(k+h|k)$ obtained in the first stage.

The final prediction for step h, h≥2, can therefore be:

$$\hat{y}_{II}(k+h|k) = \hat{y}_f(k+h|k) \hat{\epsilon}(k) + x_{AR}(k-h)^T \alpha_h(k)$$

The invention claimed is:

1. A method of predicting an effect of future wave motion on a floating system used to control generation of power by the floating system comprising:
   a) measuring at least one resultant characteristic of an effect of wave motion on the floating system for at least one time step;
   b) predicting future resultant characteristics of wave motion on the floating system for at least two future time steps by i) constructing at least one autoregressive wave model which relates at least one resultant characteristic of a future time step to the measured at least one characteristic by using time-variable coefficients, ii) determining the time-variable coefficients from use of a random walk model, and iii) determining the future resultant characteristic of wave motion for the at least two future time steps by using of the at least one autoregressive wave model, the determined time-variable coefficients and the measured at least one the characteristic of wave motion from at least one time step; and c) using the predicted future resultant characteristics of wave motion to control the generation of power which is one of electrical, pneumatic or hydraulic power by the floating system.

2. A method as claimed in claim 1, wherein the at least one resultant characteristic of wave motion is at least one of force exerted by the waves on the floating system and elevation of waves related to the floating system.

3. A method as claimed in claim 1, wherein the time-variable coefficients are determined by using at least one of an extended Kalman filter and a linear Kalman filter bank.

4. A method as claimed in claim 2, wherein the time-variable coefficients are determined by using at least one of an extended Kalman filter and of a linear Kalman filter bank.

5. A method as claimed in claim 1, wherein the random walk model is expressed by a relationship:
$a_j(k+1) = a_j(k) + \eta_j(k)$, for allowing calculation of evolution at time step k+1 of each variable coefficient $a_i$ of the autoregressive wave model, starting from a value $a_j(k)$ at time step k and corresponding stochastic uncertainty $\eta_j(k)$ at time step k.

6. A method as claimed in claim 2, wherein the random walk model is expressed by a relationship:
$a_j(k+1) = a_j(k) + \eta_j(k)$, for allowing calculation of evolution at time step k+1 of each variable coefficient $a_i$ of the autoregressive wave model, starting from a value $a_j(k)$ at time step k and corresponding stochastic uncertainty $\eta_j(k)$ at time step k.

7. A method as claimed in claim 3, wherein the random walk model is expressed by a relationship:
$a_j(k+1) = a_j(k) + \eta_j(k)$, for allowing calculation of evolution at time step k+1 of each variable coefficient $a_i$ of the autoregressive wave model, starting from a value $a_j(k)$ at time step k and corresponding stochastic uncertainty $\eta_j(k)$ at time step k.

8. A method as claimed in claim 4, wherein the random walk model is expressed by a relationship:
$a_j(k+1) = a_j(k) + \eta_j(k)$, for allowing calculation of evolution at time step k+1 of each variable coefficient $a_i$ of the autoregressive wave model, starting from a value $a_j(k)$ at time step k and corresponding stochastic uncertainty $\eta_j(k)$ at time step k.

9. A method as claimed in claim 1, wherein the autoregressive wave model is expressed with a formula:
$\hat{y}(k|k-1) = x_{AR}(k-1)^T a(k)$, with $\hat{y}(k|k-1)$ being a predicted characteristic at time step k, $x_{AR}(k-1)$ being a vector of the at least one measured resultant characteristic prior to time step k and a(k) being a vector of the time-variable coefficients of the at least one autoregressive wave model at time step k.

10. A method as claimed in claim 2, wherein the autoregressive wave model is expressed with a formula:
$\hat{y}(k|k-1) = x_{AR}(k-1)^T a(k)$, with $\hat{y}(k|k-1)$ being the predicted characteristic at time step k, $x_{AR}(k-1)$ being a vector of the at least one measured resultant characteristic prior to time step k and a(k) being the vector of the time-variable coefficients of the at least one autoregressive wave model at time step k.

11. A method as claimed in claim 7, wherein the time-variable coefficients a(k) are determined by using an extended Kalman filter and the future resultant characteristic is determined for N future time steps later than time step k, by:

(1) considering time step p=k;
(2) constructing vector $x_{AR}(p-1)^T$ of the measured at least one resultant characteristic prior to time p;
(3) determining a characteristic $\hat{y}(p+1|k)$ for time step p+1 by using a vector $x_{AR}(p-1)^T$ and vector a(k) of the time-variable coefficients; and
(4) repeating (2) and (3) for N future time steps.

12. A method as claimed in claim 9, wherein the time-variable coefficients a(k) are determined by using an extended Kalman filter and the predicted future resultant characteristics are determined for N future time steps later than time step k, by:

(1) considering time step p=k;
(2) constructing vector $x_{AR}(p-1)^T$ of the measured at least one resultant characteristic prior to time p;
(3) determining a characteristic $\hat{y}(p+1|k)$ for time step p+1 by using a vector $x_{AR}(p-1)^T$ and vector a(k) of the time-variable coefficients; and
(4) repeating (2) and (3) for N future time steps.

13. A method as claimed in claim 1 comprising for future time steps p:

(1) constructing the autoregressive wave model;
(2) determining the time-variable coefficients of the at least one autoregressive model of the time step p by use of an adaptive Kalman filter bank; and
(3) determining the at least one resultant characteristic by using the at least one autoregressive model of time step p and variable coefficients of the at least one autoregressive model of time step p.

14. A method as claimed in claim 13, wherein the at least one autoregressive wave model is expressed by a formula:

$$\hat{y}(k+h|k) = \sum_{j=1}^{p} a_{j,h}(k) y(k-j+1)$$

with $\hat{y}(k+h|k)$ being a characteristic predicted at time step k+h;
y(k−j+1) being a characteristic measured at time step k−j+1; and
$a_{j,h}(k)$ being time-variable coefficients of the at least one autoregressive model.

15. A method as claimed in claim 13, wherein characteristics of the future time steps are determined sequentially or in parallel.

16. A method as claimed in claim 14, wherein characteristics of the future time steps are determined sequentially or in parallel.

17. A method as claimed in claim 1, wherein the resultant characteristic of wave motion is corrected for the future time steps to minimize prediction error.

18. A method as claimed in claim 17, wherein the resultant characteristic of wave motion is corrected by using a Kalman filter.

19. A method as claimed in claim 1, wherein the floating system is a wave energy conversion system which converts the wave motion to electrical, pneumatic or hydraulic energy and the floating system is a floating platform or a floating wind turbine.

20. A method as claimed in claim 1 wherein the floating system comprises a wave energy conversion system, and the predicted future resultant characteristics of the wave motion act are used to control the generation of power by the energy conversion system.

* * * * *